United States Patent [19]

Rouverol

[11] Patent Number: 4,644,814

[45] Date of Patent: Feb. 24, 1987

[54] WIDE-ANGLE GEARING

[76] Inventor: William S. Rouverol, P.O. Box 9122, Berkeley, Calif. 94709

[21] Appl. No.: 757,350

[22] Filed: Jul. 22, 1985

[51] Int. Cl.$^4$ ............................................. F16H 55/08
[52] U.S. Cl. .......................................... 74/462; 74/457
[58] Field of Search ............................ 74/457, 460, 462

[56] References Cited

U.S. PATENT DOCUMENTS

| | | | |
|---|---|---|---|
| 2,760,381 | 8/1956 | Pickles | 74/460 |
| 3,631,736 | 1/1972 | Saari | 74/462 |
| 3,881,364 | 5/1975 | Rouverol | 74/462 |
| 3,918,315 | 11/1975 | Rouverol | 74/462 |
| 4,108,017 | 8/1978 | Rouverol | 74/462 |
| 4,140,026 | 2/1979 | Rouverol | 74/462 |
| 4,149,431 | 4/1979 | Rouverol | 74/462 |
| 4,259,875 | 4/1981 | Rouverol | 74/462 |
| 4,276,785 | 7/1981 | Rouverol | 74/457 |
| 4,589,300 | 5/1986 | Rouverol | 74/462 |

FOREIGN PATENT DOCUMENTS 0843630 8/1960 United Kingdom .
0992863 1/1983 U.S.S.R. .

OTHER PUBLICATIONS

Addendum No. 1 (1959) to B.S. 978: Part 2: 1952 (British "Double Circular Arc" System).

Primary Examiner—Allan D. Herrmann
Assistant Examiner—Martin G. Belisario

[57] ABSTRACT

A system of gearing that allows gears to be designed that are smaller than standard involute gears of corresponding torque capacity. This reduction in size is made possible by increasing the angle through which the teeth are engaged. The wider angle of engagement is achieved by adding to the path of contact two segments: (1) the path portion closest to the pinion is extended by adding on a slightly curved segment lying outside the circle that is the locus of interference points for involute gearing; and (2), the path portion closest to the gear is extended by adding a segment that is produced by the use of an exceptionally long pinion addendum. The reduced size of the gears made possible by the wider engagement angle obtained from addition of these two path segments not only reduces mass and pitch line velocity, but the wider engagement angle itself also affords an increased profile contact ratio that reduces transmission error. The wider angle of engagement thus reduces noise excitation in two ways. In addition, a third way may be added if proportions are used that reduce or eliminate mesh stiffness variation.

23 Claims, 3 Drawing Figures

WIDE-ANGLE GEARING

SPECIFICATION

This invention relates to gear tooth profile forms and proportions. Specifically it relates to tooth features that increase the torque capacity of a gear set. It is an improvement on, and extension of, the conceptions of U.S. Pat. No. 4,276,785.

The minimization of gear noise, which was the stated object of U.S. Pat. No. 4,276,785, has been shown by the applicant's research to require different tooth characteristics depending on the speed of operation. It is well-known that the noise excitation of a gear set exhibits a significant peak at a particular speed, called the "primary resonance speed" or "critical speed." This is the speed at which the tooth contact frequency coincides with the natural frequency for torsional oscillations of the gear set.

It will be evident that for any gear set of a given size and operating speed, the tooth contact frequency will increase in direct proportion to the number of teeth. A gear with a large number of teeth will consequently reach its critical speed at a lower rpm than it would if it had a smaller number of teeth. Thus if a gear set is to be operated at high speed, it will generally be given a comparatively large number of teeth so that it will pass *through* resonance on its way to its design operating speed. Such a gear set is said to be operated in the "supercritical domain," and in this domain large tooth numbers reduce the noise excitation in two ways: (1) by raising the excitation frequency substantially above the natural frequency, and (2) in the case of helical gears, by reducing the transmission error as a result of an increased face contact ratio.

Most power transmission gearing, however, is operated at speeds *below* the critical speed for torsional oscillations, in what is called the "subcritical domain." In this domain large tooth numbers are not advantageous, and may in some circumstances be disadvantageous. This is because increases in tooth contact frequency push the operating point closer to the resonance frequency, and this tends to nullify any reductions in noise excitation obtained by an increased face contact ratio. Accordingly, the specification in U.S. Pat. No. 4,276,785 calling for the use of 30 or more teeth on the pinion helps to minimize noise excitation in the supercritical domain but not in the subcritical domain.

The primary object of the present invention is therefore to modify the features specified in U.S. Pat. No. 4,276,785 in such a way as to make them applicable to gearing operated in the subcritical domain. Since large tooth numbers are not advantageous in this domain, pinion tooth numbers smaller than 30, (and preferably smaller than 24), are used in order to maximize torque capacity, and three means *other* than large tooth numbers are employed to reduce the noise excitation. First and foremost of these means is a reduction in size, since this affords both a reduced pitch line velocity and a reduced mass. The same means employed to reduce the size, which is an increased engagement angle, also increases the profile contact ratio. Since transmission error is inversely proportional to profile contact ratio, the wider engagement angle can be said to reduce noise excitation in two ways. In addition, noise excitation can be further reduced if gearing with a wider engagement angle is given tooth proportions that eliminate mesh stiffness variation in accordance with means disclosed in U.S. Pat. No. 4,589,300.

A second object of the invention is to provide gearing that because it can be made smaller than prior art gearing, will be lighter, more compact and less expensive to manufacture.

The means to achieve the special objects and advantages of the invention will be evident from the drawings as explained in the specification that follows.

Figure 1:
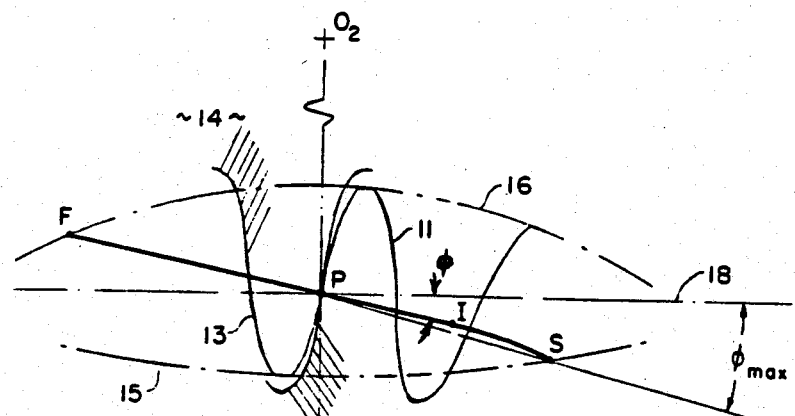
FIG. 1 is a partial section of a pair of mating helical gears taken perpendicularly to the common pitch element (i.e. "transversely") and showing mating tooth profiles embodying the invention.

In detail, and referring to FIG. 1, typical teeth 11, 13 embodying the invention are shown in transverse section engaged at pitch point P. Tooth 11, at right, is on the smaller gear 12 (pinion), and tooth 13, at left, is on the larger gear 14. Other parts of pinion 12 and gear 14, such as hubs, webs, rims, keyways, etc., are standard and are omitted in the interest of clarity.

In the embodiment illustrated in FIG. 1, pinion 12 is driving in the counter-clockwise direction, and contact between the mating teeth takes place over a path of contact that starts at point S on the addendum circle 15 of gear 14, passes through the pitch point P, and ends at point F on the pinion addendum circle 16. (In a speed increaser the direction of movement of the point of contact along the path is of course reversed.) The path segment SI is concave toward the pinion 12, but the main portion of the path IPF is straight.

A straight line joining the path starting point S and the pitch point P makes an angle $\phi_{max}$ with a line tangent to the pitch circles at P. This is the maximum transverse pressure angle of the path, and for the embodiment shown in FIG. 1, the minimum transverse pressure angle $\phi$ will be the angle between the straight segment IPF and the common tangent line 18. The difference between $\phi_{max}$ and $\phi$ should always be less than 20° and preferable less than 10°, so that variations in the direction of tooth loading will not produce undesirable vibrations. (It should be noted that the variation in pressure angle for cycloidal gearing is generally about 30°, which is one of the reasons cycloidal tooth profiles are not well suited for use in power transmission design.)

Figure 2:
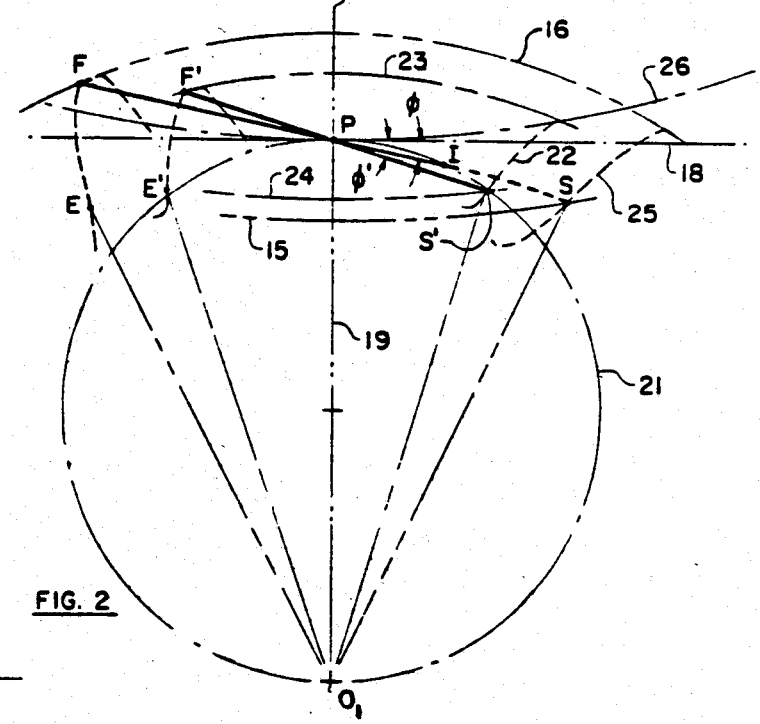
FIG. 2 is a transverse plane diagram showing (a) the circle that is the locus of all interference points for an involute pinion, and (b) the comparative paths of contact for typical involute and wide-angle gear sets.

FIG. 2 shows a transverse plane diagram of the path of contact SPF of the gear mesh shown in FIG. 1, superimposed on the comparable path S'PF' for a standard involute gear set of the same size. The locus of interference points for involute pinion teeth is a circle 21 that has as its diameter the radius $O_1P$ of the pinion colinear with the line of centers 19 connecting centers of rotation $O_1$ and $O_2$ of pinion 12 and gear 14 respectively.

When the gears are turning, a standard involute profile 22 would make contact with its mate at S' lying on the interference locus circle 21. If an involute pinion were to be rotated through its engagement angle (or "roll angle") $S'O_1E'$, the involute profile 22 would move to the broken line position F'E', where F' is determined by the intersection of the path of contact S'PF' with the pinion addendum circle 23. (E' is a point on the generated profile 22 such that E'O$_1$ is equal to S'O$_1$.)

For a gear set embodying the invention, initial tooth contact occurs at S, moves along a curved path segment SI and then a straight path segment from I to a point F where the path intersects the addendum circle 16 of the pinion. The pinion tooth 25 is shown as a broken line passing through point S where the path intersects the addendum circle 15 of the gear 14. After rotation through its engagement angle, the pinion tooth profile 25 will move to the position FE, where E is at the same distance from the pinion center O$_1$ as S. The roll angle is EO$_1$S, which will be seen to be much larger than the roll angle E'O$_1$S' for the standard involute. This is the reason the invention is referred to in this specification as "wide-angle gearing. " If the path of contact includes a substantial portion that is straight, the gearing is referred to as "wide-angle involute gearing." The pinion roll angle is generally greater than 32°, and preferable greater than 36°. To obtain roll-angles of this magnitude, it will generally be necessary to extend the curved path segment SI well beyond the pinion locus circle 21. In most cases the distance from the point S to circle 21, measured in a direction normal to the line of centers 19, should be at least one tenth of the radius of circle 21.

It will be noted that in FIG. 2 the path of contact SF for the wide-angle gearing has a curved segment SI only at one end. As explained in U.S. Pat. No. 4,276,785, the purpose of this curved segment is to avoid the generation of the cusp produced on the tooth flank if all normals to the path do not intersect the line O$_1$O$_2$. If the gear ratio is equal to or close to unity, then a curved segment will also be needed on the recess portion of the path PF, for the the same reason. In the example diagrammed in FIG. 2, however, the gear 14 is much larger than the pinion 12, so its interference point locus circle 26 will be large enough to encompass the end point F of the path. For gear pairs having a large gear ratio, the size of the recess roll angle is not governed by the size of the interference point locus circle 26 but by the teeth becoming so long that the topland area becomes too narrow and the tooth tips become excessively fragile.

Figure 3:
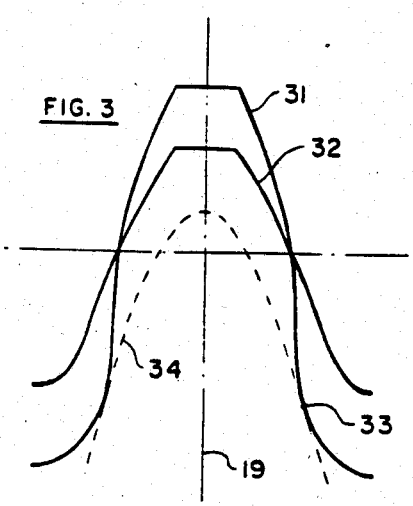
FIG. 3 is a diagram showing an enlarged view of the transverse outline of the tooth of a typical gear embodying the invention superimposed on the corresponding outline for a standard involute tooth, to show the comparative shapes.

FIG. 3 illustrates how this narrowness of the topland area occurs. In this diagram it will be evident that the wide-angle tooth 31 has a smaller pressure angle ($\phi$ in FIG. 2) than the standard involute tooth 32. It is nearly always smaller than 20° and in many cases smaller than 16°, so that the tooth sides converge more slowly and the addendum height is much greater than that for a standard involute tooth 32. The sum of the addendum coefficients for a pair of wide-angle gears is always larger than 2.0 and in nearly all cases larger than 2.2. For optimum results, the sum should be larger than 2.5.

The longer addenda of wide-angle gears illustrated in FIG. 3 of course also require deeper dedenda, to provide clearance space for the tips of the mating teeth. Typically the whole depth of wide-angle gear teeth is greater than 2.5 modules and in most cases greater than 3.0 modules. To offset the loss of bending strength in teeth that are this tall and thin, wide-angle gears have a special flank profile segment that reduces the stress concentration factor. This reduction is obtained by generating the teeth with a tool that has an intermediate radius of 1.0 to 5.0 modules interposed between the generating tool tip radius and the profile portion that generates the active tooth flank. This insures that the transverse tooth profile 31 will be tangent to the constant bending stress parabola 34 (in the U.S. referred to as the "Lewis Parabola") at a point 33 where the radius of curvature of the tooth profile is substantially larger than tooth flank points generated by the cutting tool tip radius.

It has been noted that in order to minimize the noise excitation of wide-angle gears, tooth proportions may be employed that reduce or eliminate mesh stiffness variation. As explained in U.S. Pat. No. 4,589,300, this requires that one of the contact ratios (face or profile) be close to an integer, as for example, within 0.15. If the face contact ratio is close to an integer, the teeth should be relieved but not crowned; similarly, if the profile contact ratio is close to an integer, the teeth should be crowned but not relieved.

In all gear systems, maximum torque capacity is achieved only if the gears are equally durable with respect to bending stress and surface (Hertzian) stress. When small tooth numbers are employed in order to maximize the bending strength, then it becomes advantageous to employ means to increase the surface strength to a comparable degree. One prior art patent, U.S. Pat. No. 3,631,736, proposes that this be done by modifying the working profile so as to produce a constant relative radius of curvature at all points along the path of contact. While this concept may afford advantages with respect to Hertzian stresses induced in conventional involute gears, especially when the gear ratio is high, an alternative is to take into account the fact that the stiffness of gear tooth pairs varies considerably at different points along the path of contact. Because the stiffness of a cantilever beam or plate varies inversely as the cube of the length-to-depth ratio, the tooth pair stiffness at path end-points S and F in FIG. 2 is between one third and one half the tooth pair stiffness at the pitch point P. This is because one tooth is loaded at its extreme tip. As a result, the tooth load at points S and F will be quite light, and may be even lighter as a result of profile relief. An additional factor that must be considered is the relative sliding velocity, since it is known that high sliding velocity reduces Hertzian load capacity.

If it may be assumed that the load-lightening effects of profile relief are roughly sufficient to accommodate the reduced load capacity of high relative sliding points such as S and F of FIG. 2, then it follows that the optimum variation pattern for the relative radii of curvature is one that coincides closely with the tooth pair stiffness, at least to the extent that such a pattern of variation is not in conflict with the necessity of avoiding tooth flank cusping (see above). Although detailed calculations are required, extensive possibilities exist for varying the tooth pair stiffness by varying the relative dedendum depths of the teeth 11, 13 of the pinion 12 and gear 14 respectively. One method of placing the point of maximum relative profile curvature as close as possible (within 0.5 modules at most) to the point of maximum tooth pair stiffness is to shift the latter in the direction of point F (FIG. 2) by giving the pinion teeth a larger addendum coefficient that that of the gear, and also making the pinion teeth stiffer by increasing their transverse circular thickness while decreasing that of the teeth of the gear.

A number of characteristics of the wide-angle concept should be noted: (1) the concept is applicable to bevel and spiral bevel gearing as well as external and internal parallel-axis gearing, with the line of centers simply being the line joining the apexes of the back cones of the mating pair; (2) the reduced pressure angle and extending of the path of contact outside the involute interference locus circle (21 in FIG. 2) gives wide-angle gearing a roll angle that is typically 40 to 50% greater than that of standard involute gearing and 30 to 40% greater than that of AGMA 14½° composite gearing, "high contact ratio" gearing, recess action involute gearing, "Evoloid" gearing (U.S. Pat. No. 3,247,736) and "Concurve" gearing (U.S. Pat. No. 3,631,736); (3) within the above-noted limitations with regard to the direction of the normals to the path, a number of different curves may be used for the path segment SI, such as those produced by basic rack curves such as sine curves, polynomials, etc.; as is well-known, the path of contact for conjugate gearing is fully determinative of the basic rack and the active profiles of both pinion and gear.

To clarify the scope of the ensuing claims, the following definitions are provided: "transverse" means the direction of motion of the teeth when a gear rotates on a fixed center; "common tangent line" means a line in the transverse direction tangent to the patch circles of a pair of mating gears at the pitch point; "path of contact" means a line in the transverse plane along which tooth contact occurs when a pair of gears is transmitting full torque so that the line extends from the addendum circle of one of the gears to the addendum circle of the other; "non-straight" means including a curved portion or a portion made up of a pair of non-colinear straight lines; "common pitch element" means the element common to the pitch surfaces of a pair of mating gears; "transverse pressure angle" means the angle between the common tangent line and a straight line connecting a point on the path of contact to the pitch point; "whole depth" means the depth of a tooth exclusive of any tip chamfer that may be present; "face contact ratio" means the tooth overlap ratio or axial contact ratio; "profile contact ratio" means the transverse contact ratio, which is equal to the pinion roll angle divided by the pinion pitch angle; "tooth pair stiffness" means the transverse tangential tooth load on a single pair of engaged teeth needed to produce unit transverse deflection in the direction of the pressure line at a given point on the path of contact; "addendum coefficient" means the ratio of addendum height to module.

I claim:

1. A pair of mating gears having coplanar axes and teeth formed to be conjugate in the transverse direction along a path of contact that is non-straight,
    said path of contact intersecting the interference point locus circle of one of said pair at two points and terminating outside of said circle,
    the sum of the addendum coefficients of the teeth of said pair being greater than 2.0,
    the number of teeth on one of said pair being smaller than 30,
    the difference between the maximum and minimum transverse pressure angles at points on said path of contact being smaller than 20°.

2. A pair of mating gears according to claim 1 wherein said teeth are slantingly disposed with respect to the common pitch element of said pair.

3. A pair of mating gears according to claim 1 wherein said path of contact includes a straight segment.

4. A pair of mating gears according to claim 1 wherein said sum is greater than 2.2.

5. A pair of mating gears according to claim 1 wherein said sum is greater than 2.5.

6. A pair of mating gears according to claim 1 wherein said number of teeth is smaller than 24.

7. A pair of mating gears according to claim 1 wherein said difference is smaller than 10°.

8. A pair of mating gears according to claim 1 wherein said teeth have a transverse pressure angle at the pitch point smaller than 20°.

9. A pair of mating gears according to claim 1 wherein said teeth have a transverse pressure angle at the pitch point smaller than 16°.

10. A pair of mating gears according to claim 1 wherein each tooth of one of said pair is engaged through a roll angle of at least 32°.

11. A pair of mating gears according to claim 1 wherein each tooth of one of said pair is engaged through a roll angle of at least 36°.

12. A pair of mating gears according to claim 1 wherein said teeth of one of said pair have a whole depth greater than 2.5 modules.

13. A pair of mating gears according to claim 1 wherein said teeth of one of said pair have a whole depth greater than 3.0 modules.

14. A pair of mating gears according to claim 1 wherein the face contact ratio is within 0.15 of an integer.

15. A pair of mating gears according to claim 1 wherein the profile contact ratio is within 0.15 of an integer.

16. A pair of mating gears according to claim 1 wherein said teeth of one of said pair are relieved but not crowned.

17. A pair of mating gears according to claim 1 wherein said teeth of one of said pair are crowned but not relieved.

18. A pair of mating gears according to claim 1 wherein one of said pair is smaller and has stiffer teeth than the other.

19. A pair of mating gears according to claim 1 wherein one of said pair is smaller and has a larger addendum coefficient than the other.

20. A pair of mating gears according to claim 1 wherein said teeth are formed to have relative radii of curvature at each point on said path of contact in proportion to the tooth pair stiffness at said point.

21. A pair of mating gears according to claim 1 wherein the relative radius of curvature of the active profiles of said teeth has its maximum value at a first point on said path of contact, and the tooth pair stiffness of said teeth has its maximum value at a second point on said path of contact, and said first point and said second point are spaced apart by not more than 0.5 modules.

22. A pair of mating gears according to claim 1 wherein the inactive flanks of the teeth of at least one of said pair include a segment generated by a portion of the basic rack that lies between the tip radius and the active flank radius and has a radius of 1.0 to 5.0 modules.

23. A pair of mating gears according to claim 1 wherein the end of said path closest to said circle is outside of it by a distance of at least one tenth of the radius of said circle, said distance being measured in a direction normal to the line of centers of said pair.

* * * * *